(12) United States Patent
Thelen

(10) Patent No.: US 10,535,450 B2
(45) Date of Patent: Jan. 14, 2020

(54) INSULATOR ATTACHMENT

(71) Applicant: Marshall Glenn Thelen, Hewitt, MN (US)

(72) Inventor: Marshall Glenn Thelen, Hewitt, MN (US)

(*) Notice: Subject to any disclaimer, the term of this patent is extended or adjusted under 35 U.S.C. 154(b) by 67 days.

(21) Appl. No.: 15/991,251

(22) Filed: May 29, 2018

(65) Prior Publication Data
US 2019/0237223 A1 Aug. 1, 2019

Related U.S. Application Data

(60) Provisional application No. 62/623,947, filed on Jan. 30, 2018.

(51) Int. Cl.
| | |
|---|---|
| *H01B 17/14* | (2006.01) |
| *E04H 17/26* | (2006.01) |
| *E04H 17/24* | (2006.01) |
| *F16B 2/24* | (2006.01) |
| *E04H 17/18* | (2006.01) |
| *E04H 17/10* | (2006.01) |
| *F16H 55/36* | (2006.01) |

(52) U.S. Cl.
CPC .......... *H01B 17/145* (2013.01); *E04H 17/24* (2013.01); *E04H 17/266* (2013.01); *F16B 2/248* (2013.01); *E04H 17/10* (2013.01); *E04H 17/18* (2013.01); *F16H 55/36* (2013.01)

(58) Field of Classification Search
CPC ...... H01B 17/145; H01B 17/16; H01B 17/00; H01B 17/02; H01B 7/12; H01B 7/14; E04H 17/24; E04H 17/266; E04H 17/10; E04H 17/18; E04H 17/12; E04H 17/00; E04H 17/02; F16H 55/36; F16B 2/248

USPC ........ 174/158 F, 161 F, 163 F, 137 R, 138 R, 174/148; 248/65, 49, 68.1, 74.1; 256/10, 256/47, 48, 32, 33, 42
See application file for complete search history.

(56) References Cited

U.S. PATENT DOCUMENTS

| | | | | |
|---|---|---|---|---|
| 2,429,029 | A * | 10/1947 | Newbern | H01B 17/145 174/163 F |
| 4,077,611 | A * | 3/1978 | Wilson | A01K 3/005 174/163 F |
| D248,750 | S * | 8/1978 | Langlie | 174/158 F |
| 4,263,477 | A * | 4/1981 | Wilson, Sr. | H01B 17/145 174/158 F |
| 5,032,693 | A * | 7/1991 | Langlie | A01K 3/005 174/158 F |

(Continued)

*Primary Examiner* — Angel R Estrada
(74) *Attorney, Agent, or Firm* — Fredrikson & Byron, P.A.

(57) ABSTRACT

An insulator attachment device includes an insulator clip and a support clip. The insulator clip can have a lever arm and a catch arm. The insulator clip can move between an opened position, at which the lever arm is spaced from the catch arm, and a closed position, at which the lever arm is seated at the catch arm. The insulator clip can receive a fencing insulator in the opened position. The support clip can include a securing portion and a receiving portion. The securing portion can secure the support clip to a fencing post and the receiving portion can receive the insulator clip. The securing portion can include a first connection arm and a second connection arm. Each of the first connection arm and the second connection arm can secure the support clip to the fencing post. The receiving portion can include a biasing element.

20 Claims, 10 Drawing Sheets

(56) References Cited

U.S. PATENT DOCUMENTS

| | | | |
|---|---|---|---|
| 5,063,274 A * | 11/1991 | Johnson | H01B 17/145 |
| | | | 174/158 F |
| 5,959,255 A * | 9/1999 | Langlie | H01B 17/145 |
| | | | 174/161 F |
| 6,583,363 B1 * | 6/2003 | Wilson, Jr. | H01B 17/145 |
| | | | 174/158 F |
| 6,872,892 B1 * | 3/2005 | Burdick | H01B 17/145 |
| | | | 174/158 F |

* cited by examiner

INSULATOR ATTACHMENT

RELATED APPLICATION

This application claims the benefit of U.S. Provisional Application No. 62/623,947 filed Jan. 30, 2018, the contents of which are hereby incorporated by reference.

TECHNICAL FIELD

This disclosure generally relates to devices, systems, and methods for fencing or other barrier-type applications. More particularly, this disclosure relates, in certain examples described herein, to insulator attachment devices for securing a fencing insulator at a fencing post to support a fencing wire, such as in agricultural fencing applications.

BACKGROUND

Barriers, including fences, are used in a variety of applications to, for instance, define boundaries, contain animals, and/or perform environmental functions (e.g., erosion control). In many applications such barriers, including fences, are not intended to be permanent fixtures but instead may be installed at one location and later rearranged or taken down entirely and, perhaps, moved to, and installed at, a different location.

However, many such barriers can be burdensome to install. This problem is particularly compounded in those applications where barriers are relatively frequently rearranged or moved. For example, one common fencing system includes a series of spaced apart posts with one or more parallel wires spanning from post-to-post. Typically, the wire is supported at each post by an ad-hoc fastening of the wire itself at the post. This is especially challenging when the wire is to be fastened at a corner of the fencing system. As such, installing this type of fencing system can be time-consuming and burdensome given the means by which a wire is fastened at each individual post in the larger system. This becomes particularly true since many fencing systems span relatively large distances and include multiple wires.

SUMMARY

Various exemplary embodiments are described herein relating to devices, systems, and methods for fencing or other barrier-type applications. For example, embodiments disclosed herein can be useful in enabling quick and convenient fencing installation and removal. Embodiments disclosed herein can do so by providing means for enabling a fencing insulator, which can be used to support a fencing wire, to be easily secured at, and later removed from, a fencing post. This can allow fencing to be efficiently installed and removed as desired by eliminating previously burdensome fastening techniques associated with securing fencing wire at each fencing post. Embodiments disclosed herein may be particularly beneficial in installing and removing wire at corners of fencing structures. Moreover, embodiments disclosed herein may increase safety when installing and removing fencing.

One exemplary embodiment includes an insulator attachment device. This insulator attachment device embodiment includes an insulator clip and a support clip. The insulator clip can include a lever arm and a catch arm. The insulator clip can be configured to move between an opened position at which the lever arm is spaced from the catch arm and a closed position at which the lever arm is seated at the catch arm. The insulator clip can be configured to receive a fencing insulator in the opened position. The support clip can include a securing portion and a receiving portion. The securing portion can be configured to secure the support clip to a fencing post and the receiving portion can be configured to receive the insulator clip. The securing portion can include a first connection arm and a second connection arm. Each of the first connection arm and the second connection arm can be configured to secure the support clip to the fencing post. The receiving portion can include a biasing element.

Another exemplary embodiment includes a fencing system. This fencing system embodiment includes a fencing insulator, an insulator clip, and a support clip. The fencing insulator can have a body defining a wire receiving surface and an internal bore. The insulator clip can include a lever arm and a catch arm. The insulator clip can be configured to move between an opened position at which the lever arm is spaced from the catch arm and a closed position at which the lever arm is seated at the catch arm. The internal bore of the fencing insulator can be positioned at the insulator clip. The support clip can include a securing portion and a receiving portion. The securing portion can be configured to secure the support clip to a fencing post and the receiving portion can be linked to the insulator clip. The securing portion can include a first connection arm and a second connection arm. Each of the first connection arm and the second connection arm can be configured to secure the support clip to the fencing post. The receiving portion can include a biasing element.

In one, additional exemplary case, the fencing system embodiment can also include a fencing post and a fencing wire. The fencing post can have a first flange and a second flange. The first connection arm can be secured to the first flange of the fencing post and the second connection arm can be secured to the second flange of the fencing post. The fencing wire can be seated at the wire receiving surface of the fencing insulator.

A further exemplary embodiment includes a method for installing a fence. This method embodiment includes moving an insulator clip, in opposition to an insulator clip bias force, from a closed position, at which a lever arm of the insulator clip is seated at a catch arm of the insulator clip, to an opened position, at which the lever arm is spaced from the catch arm. This method also includes linking a support clip to the insulator clip. The support clip can include a securing portion and a receiving portion, where the securing portion has a first connection arm and a second connection arm and the receiving portion has a biasing element. The support clip and the insulator clip can be linked at the receiving portion of the support clip. This method further includes placing a fencing insulator on the insulator clip when the insulator clip is in the opened position. This method additionally includes moving the insulator clip from the opened position to the closed position after the support clip and the insulator clip are linked. This method also includes securing the first connection arm to a fencing post and securing the second connection arm to the fencing post. And, this method includes positioning fencing wire onto the fencing insulator.

The details of one or more examples are set forth in the accompanying drawings and the description below. Other features, objects, and advantages will be apparent from the description and drawings.

BRIEF DESCRIPTION OF DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and provides some practical illustrations and examples. Those skilled in the art will recognize that many of the noted examples have a variety of suitable alternatives.

Figure 1:
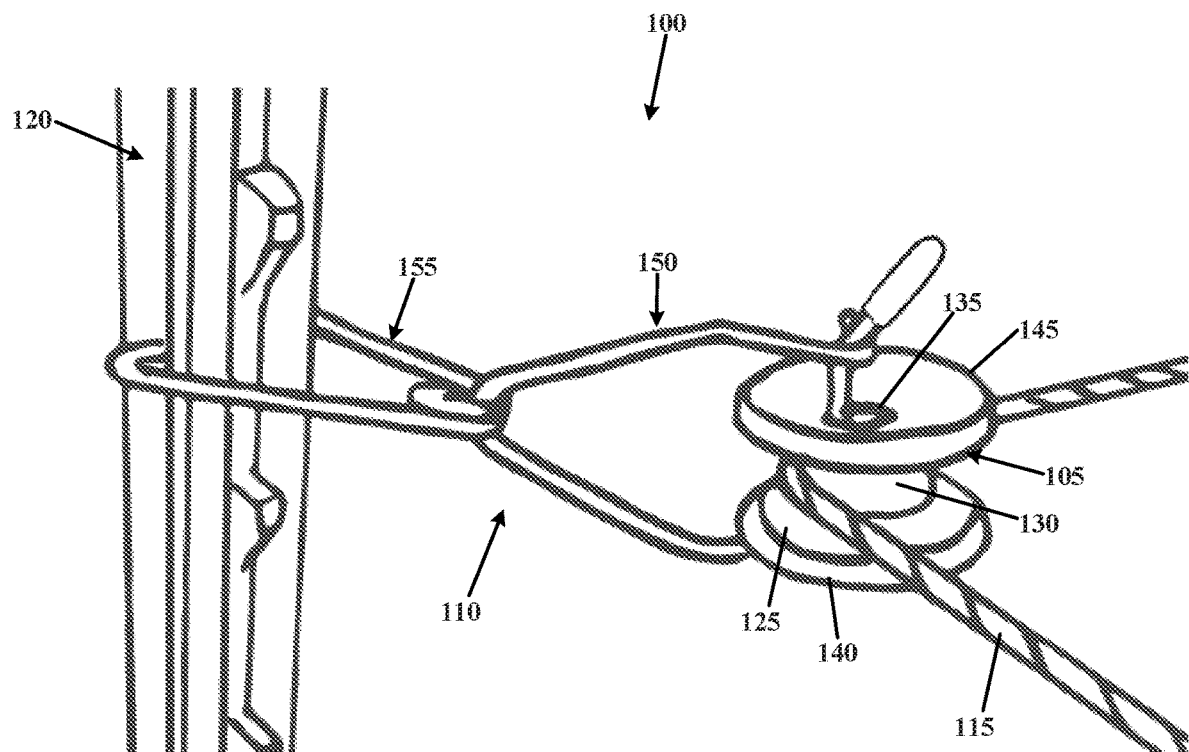
FIG. 1 is a perspective view of an exemplary embodiment of a fencing system.

FIG. 1 illustrates a perspective view of an exemplary embodiment of a fencing system 100. The fencing system 100, shown here, includes a fencing insulator 105, an insulator attachment device 110, a fencing wire 115, and a fencing post 120. The fencing system 100 can include a number of fencing posts 120, insulator attachment devices 110, and fencing insulators 105 to support and secure one or more fencing wires 115 along a desired distance. As such, the fencing system 100 can be installed at a location and span over a distance thereat to, for instance, define a boundary, contain one or more animals, and/or serve a number of other purposes.

The fencing post 120 can be fixed in place at a ground surface and extend up, generally perpendicularly, from the ground surface. A number of additional fencing posts 120 can be similarly fixed in place and spaced apart along a desired distance. The fencing post 120 can take a variety of forms. In the example shown here, the fencing post 120 can be referred to as a "t-post," though in other examples various other types of appropriate fencing posts can be used.

The fencing insulator 105 can be configured to support the fencing wire 115. The fencing insulator 105 can include a body 125 that defines a wire receiving surface 130 and an internal bore 135. The wire receiving surface 130 can be configured to receive and interface with the fencing wire 115. In the illustrated embodiment, the wire receiving surface 130 is present at a recess portion located between a first flange 140 and a second flange 145 of the fencing insulator 105. The internal bore 135 may extend through the fencing insulator 105 from the first flange 140 to the second flange 145.

The insulator attachment device 110 can be configured to secure the fencing insulator 105 to the fencing post 120. In the example shown here, the insulator attachment device 110 includes an insulator clip 150 and a support clip 155. The insulator clip 150 can be configured to receive the fencing insulator 105 and the support clip 155 can be configured to secure to the fencing post 120. As such, by placing the fencing insulator 105 at the insulator clip 150 and securing the support clip 155 to the fencing post 120, the insulator attachment device 110 can serve to secure the fencing insulator 105 to the fencing post 120 and thereby allow the fencing wire 115 to be installed in the fencing system 100. The insulator attachment device 110 can provide a convenient and efficient means for installing and removing the fencing system 100 by allowing the fencing insulator 105, and the fencing wire 115 supported thereat, to be easily and quickly positioned without the need for tedious fastening of the fencing wire 115 and/or the fencing insulator 105 at the fencing post 120. The insulator attachment device 110 can be particularly helpful in conveniently installing corners of a fencing system 100.

Figure 2:
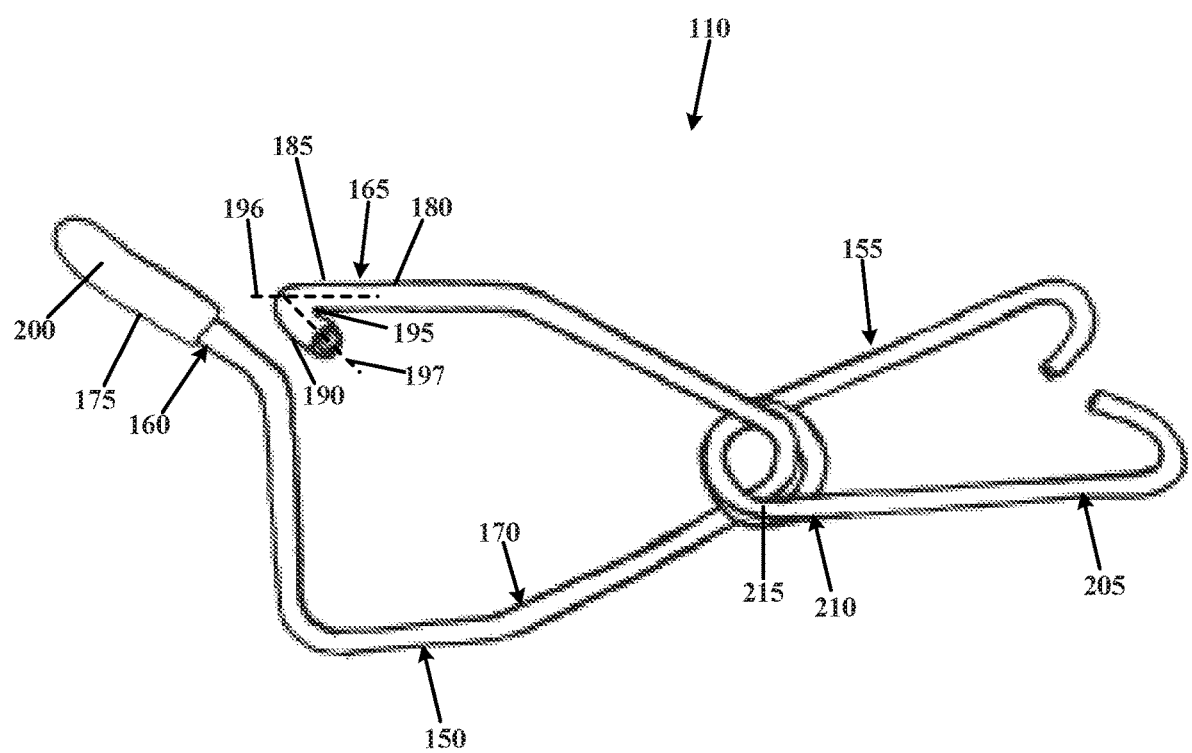
FIG. 2 is a perspective view of an exemplary embodiment of an insulator attachment device.

FIG. 2 shows a perspective view of an exemplary embodiment of the insulator attachment device 110. As noted, the insulator attachment device 110 can include the insulator clip 150 and the support clip 155. The insulator clip 150 and the support clip 155 can be removably linked together as shown here. For example, the support clip 155 can be received at the insulator clip 150, for instance by removably sliding the support clip 155 onto the insulator clip 150.

The insulator clip 150 can include a lever arm 160 and a catch arm 165. In the illustrated embodiment, the insulator clip 150 also includes a continuous body 170 having a first body end 175 and a second body end 180. The second body end 180 can be at an opposite end of the continuous body 170 from the first body end 175 such that the continuous body 170 extends continuously from the first body end 175 to the second body end 180. As shown here, the lever arm 160 can be at the first body end 175 and the catch arm 165 can be at the second body end 180.

The catch arm 165 can include a first catch arm portion 185, a second catch arm portion 190, and a seating surface 195. The seating surface 195 can between the first catch arm portion 185 and the second catch arm portion 190. For instance, as shown, each of the first catch arm portion 185, the second catch arm portion 190, and the seating surface 195 can be at the second body end 180 and the seating surface 195 can be a location along the continuous body 170 that is between the first catch arm portion 185 and the second catch arm portion 190. The second catch arm portion 190 can extend from the first catch arm portion 185 at an angle such that the second catch arm portion 190 and the first catch arm portion 185 are non-parallel. The first catch arm portion 185 can extend along a longitudinal axis 196 and the second catch arm portion 190 can extend along a longitudinal axis 197. In one embodiment, the seating surface 195 can be included at the intersection of the longitudinal axis 196 and the longitudinal axis 197. In some embodiments, such as that shown here, the second catch arm portion 190 can extend from the first catch arm portion 185 at an angle greater than ninety degrees and less than one hundred and eighty degrees relative to the first catch arm portion 185 (e.g., relative to the degree of extension to move the second catch arm portion 190 from an end of the first catch arm portion 185 on the longitudinal axis 196 to the exemplary orientation shown in FIG. 2). For instance, the longitudinal axis 197 can extend out from the longitudinal axis 196 at an angle greater than ninety degrees and less than one hundred and eighty degrees as measured from a point on the longitudinal axis 196 at an end of the catch arm portion 165. In such embodiments, the seating surface 195 can be present at the complimentary angle that is greater than zero degrees and less than ninety degrees between the first catch arm portion 185 and the second catch arm portion 190.

The insulator clip 150 can be configured to be move between an opened position and a closed position, for instance by moving one of the lever arm 160 and catch arm 165 relative to the other of the lever arm 160 and the catch arm 165. FIG. 2 shows the insulator clip 150 at the opened position. At the opened position, the lever arm 160 can be spaced from the catch arm 165. Conversely, at the closed position (shown, e.g., in FIG. 3), the lever arm 160 can be seated at the catch arm 165. The lever arm 160 can include a protective cap 200, such as at the first body end 175, and when the insulator clip 150 is in the closed position the lever arm 160 at or near the protective cap 200 can be seated at the catch arm 165. The insulator clip 150 can be configured to move between the opened and closed positions upon user-applied force at the lever arm 160 and/or the catch arm 165. The protective cap 200 can be made of a polymer of other material that is generally softer than the material of the continuous body 170 and the protective cap 200 may have a curved end as shown in FIG. 2. In this way, the protective cap 200 can help to enhance safety associated with user-manipulation of the insulator clip 150 at the lever arm 160.

The insulator clip 150 may be brought to the opened position so that one or more components can be received at the insulator clip 150. For example, as shown in FIG. 2, in the opened position the insulator clip 150 can be linked with the support clip 155. The support clip 155 can include a securing portion 205 and a receiving portion 210. The receiving portion 210 can be configured to receive the insulator clip 150. For instance, the receiving portion 210 can include a biasing element 215. The receiving portion 210 can be configured to receive the insulator clip 150 at the biasing element 215 as is shown in FIG. 2. As one example, when the insulator clip 150 is in the opened position, one of the lever arm 160 and the catch arm 165 can be placed through the biasing element 215. The support clip 155 can then be moved along the continuous body 170 of the insulator clip 150 and the insulator clip 150 can be moved to the closed position so that the support clip 155 is securely received at the insulator clip 150. In other embodiments, the support clip 155 can be received at the insulator clip 150 at another location on the receiving portion 210.

Figure 3:
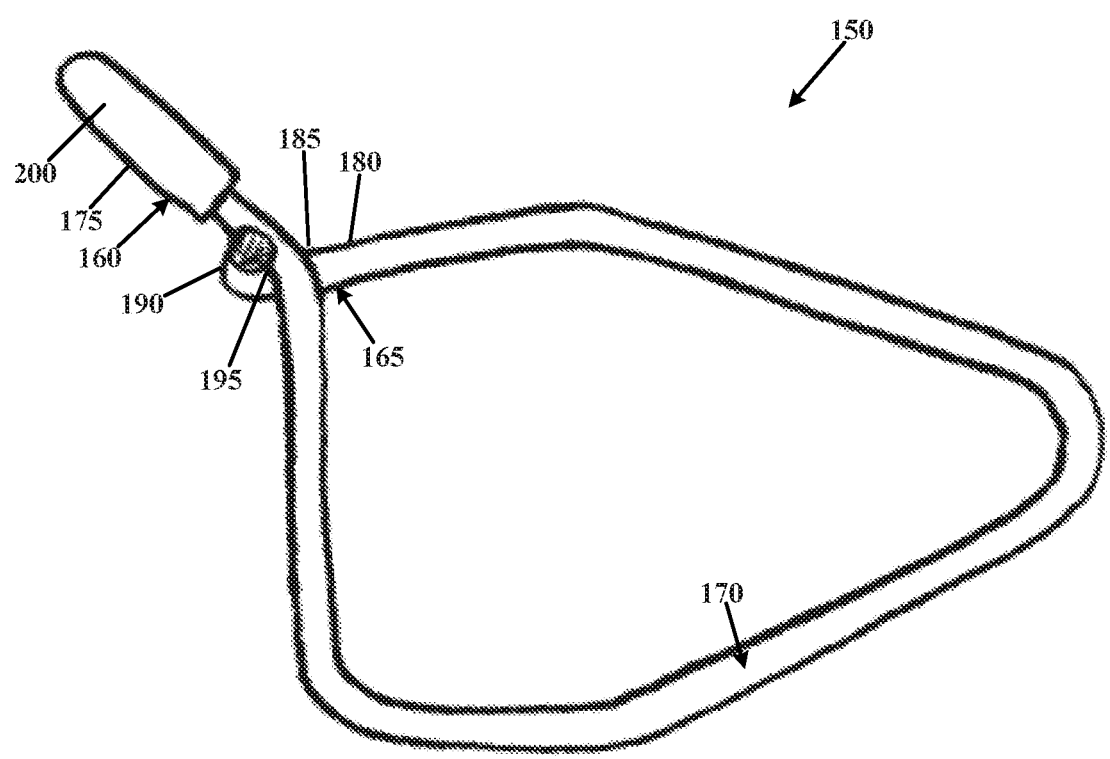
FIG. 3 is perspective view of an exemplary embodiment of an insulator clip of the insulator attachment device of FIG. 2.

FIG. 3 shows a perspective view of the exemplary embodiment of the insulator clip 150 of FIG. 2 in isolation. In FIG. 3, the insulator clip 150 is shown in the closed position. As noted, when the insulator clip 150 is in the closed position the lever arm 160 can be seated at the catch arm 165. In particular, as shown here, when the insulator clip 150 is in the closed position and the lever arm 160 is seated at the catch arm 165, the lever arm 160 can be seated at the seating surface 195. The second catch arm portion 190 may be configured, for instance due to the orientation of its extension from the first catch arm portion 185, to retain the lever arm 160 at the closed position seated at the catch arm 165.

In some embodiments, the insulator clip 150 can include a bias force imparted on one or more portions of the insulator clip 150. For example, the continuous body 170 can be configured to impart an insulator clip bias force on the lever arm 160, the catch arm 165, or each of the lever arm 160 and the catch arm 165. This insulator clip bias force can be configured to maintain the insulator clip 150 in the closed position at which the lever arm 160 is seated at the catch arm 165. In such embodiments, to move the insulator clip 150 from the closed position to the opened position the insulator clip bias force first needs to be overcome by sufficient force. In some cases, the continuous body 170 can be configured to impart the insulator clip bias force due to the orientation of one or more portions of the continuous body 170, such as one or more portions of the continuous body 170 proximate the lever arm 160 and/or the catch arm 165. In certain additional or alternative cases, the continuous body 170 can be configured to impart the insulator clip bias force due to the material composition of one or more portions (e.g., all) of the continuous body 170.

Figure 4A:
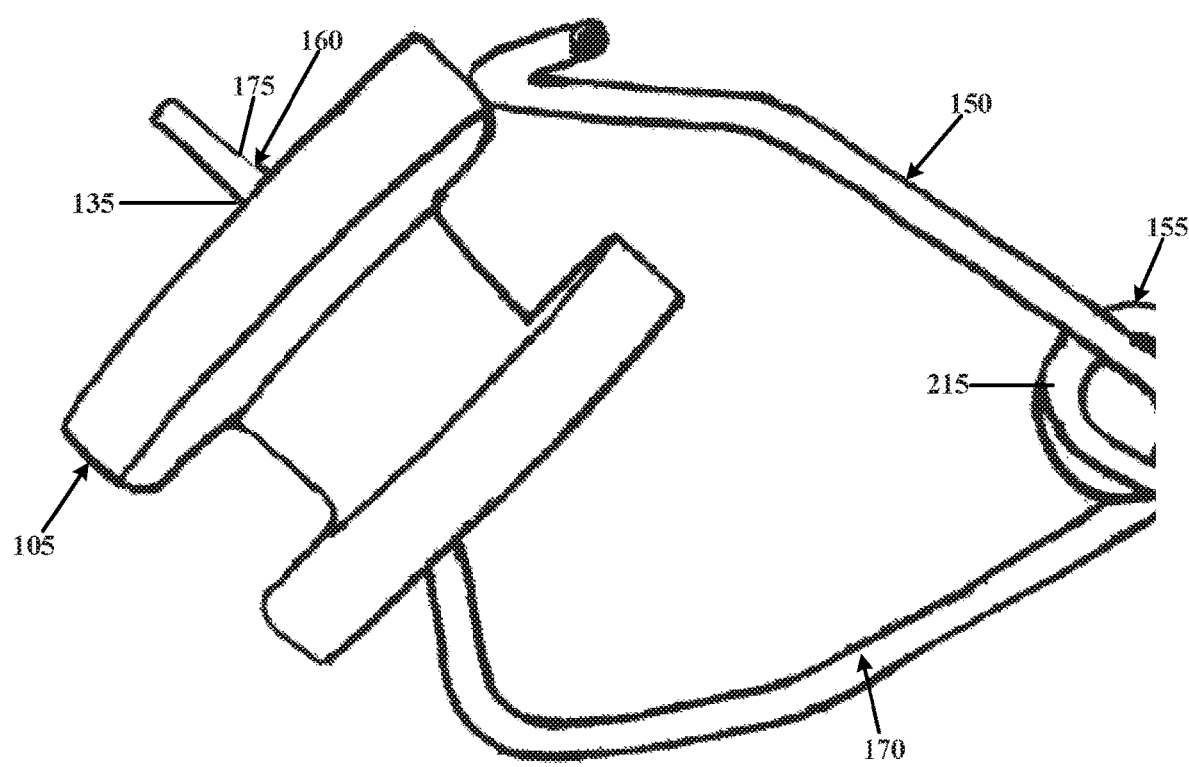
FIG. 4A is a perspective view of the insulator clip of FIG. 3 in an opened position and receiving a fencing insulator.
Figure 4B:
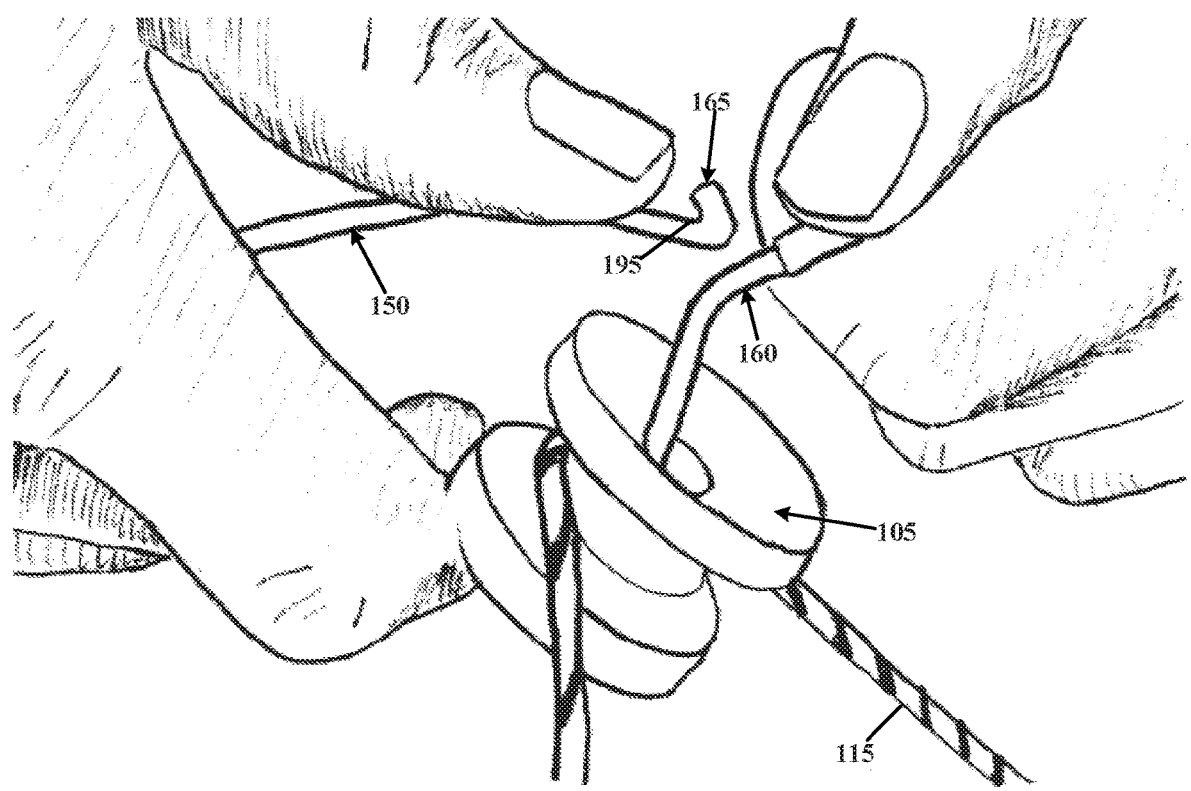
FIG. 4B is a perspective view of the insulator clip of FIG. 3 being moved to a closed position.

Another component that can be received at the insulator clip 150 is the fencing insulator 105. FIGS. 4A and 4B show the insulator clip 150 receiving the fencing insulator 105. FIG. 4A shows a perspective view of the insulator clip 150 in the opened position and receiving the fencing insulator 105, while FIG. 4B shows a perspective view of the insulator clip 150 being moved to the closed position after having received the fencing insulator 105.

When in the opened position, as shown in FIG. 4A, the insulator clip 150 can be configured to receive the fencing insulator 105. As shown in this example, the fencing insulator 105 can be received at the lever arm 160 of the insulator clip 150. For instance, the internal bore 135 of the fencing insulator 105 can be moved along the lever arm 160 such that the first body end 175 passes through, and out from, the internal bore 135. The fencing insulator 105 can then be moved from the first body end 175 onto another portion of the continuous body 170. In some cases the insulator clip 150 can receive the fencing insulator 105 prior to receiving the support clip 155 (e.g., at the biasing element 215), while in other cases the insulator clip 150 can receive the fencing insulator 105 after receiving the support clip 155.

As shown in FIG. 4B, once the insulator clip 150 has received the fencing insulator 105 the insulator clip 150 can be moved to the closed position. For instance, once the fencing insulator 105 is received at the lever arm 160 and the fencing insulator 105 is moved from the first body end onto another portion of the continuous body of the insulator clip 150 the insulator clip 150 can be moved to the closed position. As described previously, the insulator clip 150 can be moved to the closed position, for example, by moving one of the lever arm 160 and catch arm 165 relative to the other of the lever arm 160 and the catch arm 165 so that the lever arm 160 becomes seated at seating surface 195 of the catch arm 165. In some cases, the fencing wire 115 can be placed at the fencing insulator 105 prior to moving the insulator clip 150 to the closed position, while in other cases the fencing wire 115 can be placed at the fencing insulator 105 after moving the insulator clip 150 to the closed position. The ability of the insulator clip 150 to be movable between the opened and closed positions can thus facilitate placement of fencing wire 115 in a more convenient manner (e.g., when the insulator clip 150 is in the opened position).

Figure 5:
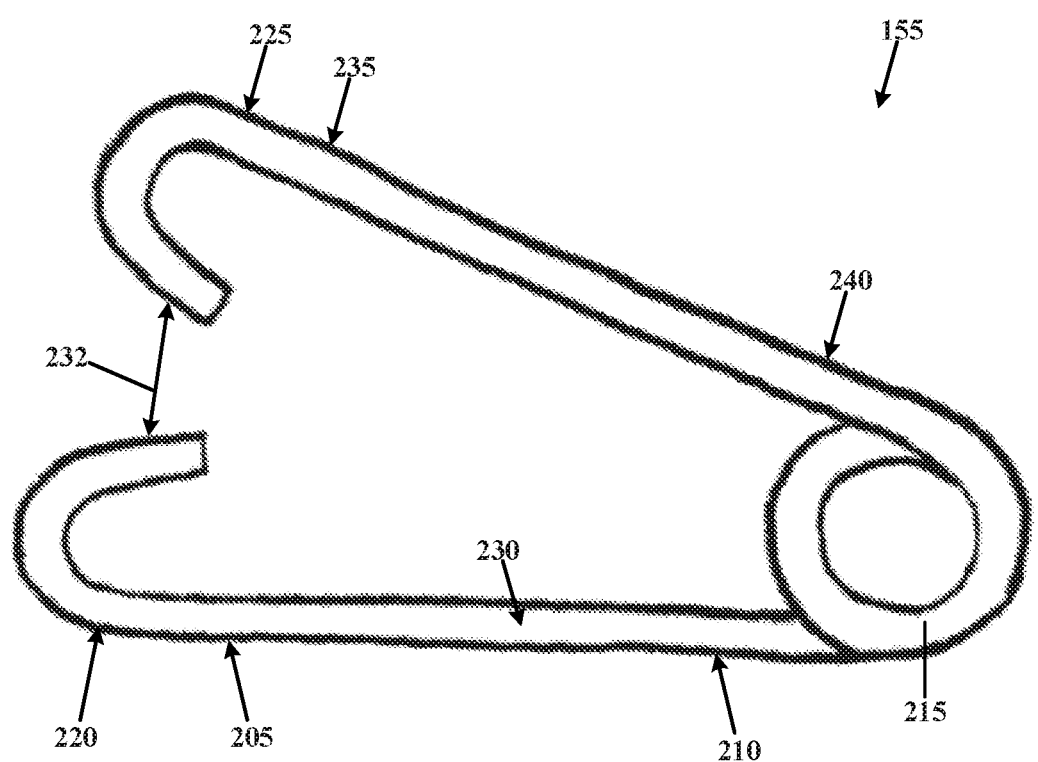
FIG. 5 is a plan view of an exemplary embodiment of a support clip of the insulator attachment device of FIG. 2.

FIG. 5 shows a plan view of the exemplary embodiment of the support clip 155 of FIG. 2 in isolation. As noted previously, the support clip 155 can include the securing portion 205 and the receiving portion 210. The receiving portion 210 can include the biasing element 215 as shown here. The receiving portion 210 can be configured to receive the insulator clip while the securing portion 205 can be configured to secure the support clip 155 to a fencing post.

The securing portion 205 can include a first connection arm 220, a second connection arm 225, and a continuous body 230. Each of the first connection arm 220 and the second connection arm 225 can be configured to secure the support clip 155 to the fencing post. A distance 232 may be defined between the first connection arm 220 and the second connection arm 225. In the embodiment shown here, the each of the first connection arm 220 and the second connection arm 225 can form a hook that is configured to secure the support clip 155 to the fencing post. The hook can include a curved extension generally greater than ninety degrees and less than two hundred and seventy degrees (e.g., less than one hundred and eighty degrees, as shown here). The continuous body 230 can have a first body end 235 and a second body end 240 that is opposite the first body end 235. The first connection arm 220 and the second connection arm 225 can be at the first body end 235 while the biasing element 215 can be at the second body end 240.

The biasing element 215 can be configured to impart a support clip bias force on each of the first connection arm 220 and the second connection arm 225. The support clip bias force can act to maintain the distance 232 between the first connection arm 220 and the second connection arm 225. As such, in order to change the distance 232 between the first connection arm 220 and the second connection arm 225, the support clip bias force imparted by the biasing element 215 may need to be overcome. In the illustrated embodiment, the biasing element 215 is a torsion spring, for instance formed by the continuous body 230. Though, in other embodiments, the biasing element 215 can be a number of other mechanisms, such as a compression spring or selective snap fit interlock, suitable for imparting the support clip bias force on the first connection arm 220 and the second connection arm 225.

Figure 6:
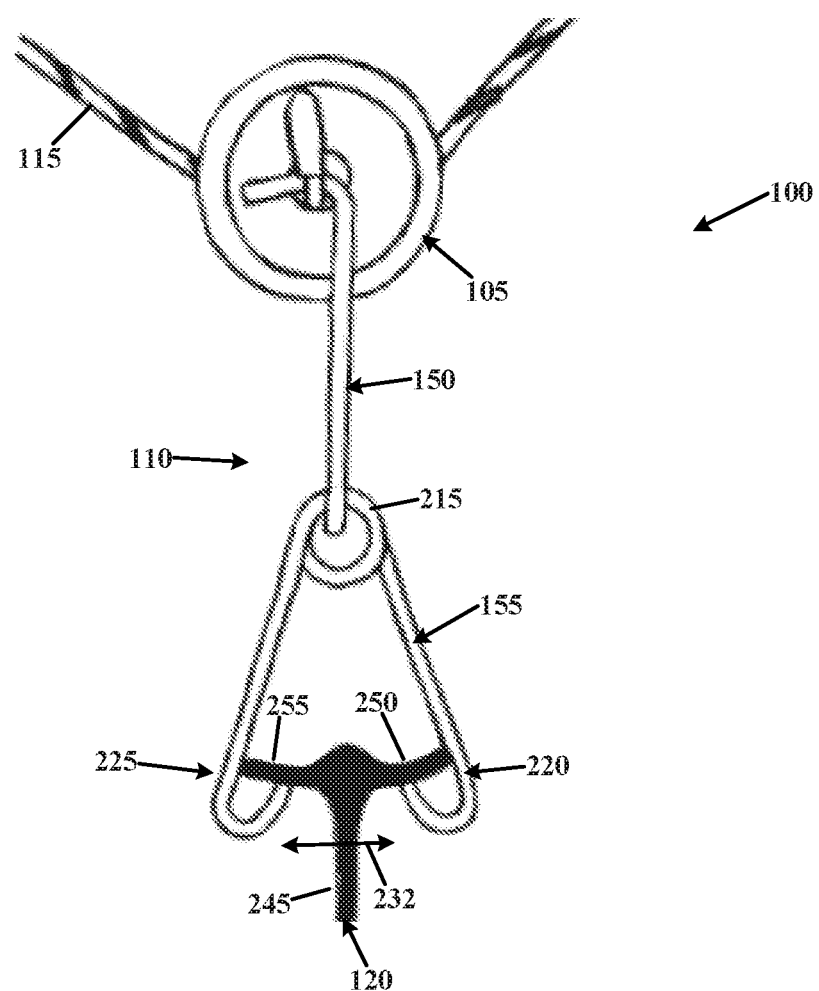
FIG. 6 is a plan view of the fencing system of FIG. 1.

FIG. 6 shows a plan view of the fencing system 100 of FIG. 1. In particular, FIG. 6 illustrates the insulator attachment device 110 securing the fencing insulator 105 to the fencing post 120. As shown here, the support clip 155 is secured to the fencing post 120. The fencing post 120 shown here can be referred to as a "t-post," having a base 245, a first flange 250 and a second flange 255. The first flange 250 and the second flange 255 can extend out from opposite sides of the base 245.

The first connection arm 220 can be configured to secure the support clip 155 to the first flange 250 and the second connection arm 225 can be configured to secure the support clip 155 to the second flange 255. For example, to secure the support clip 155 to the fencing post 120, the support clip bias force imparted by the biasing element 215 can be overcome by user-applied force at the support clip 155 to increase the distance between the first connection arm 220 and the second connection arm 225. At this point, while the user-applied force is still present on the support clip 155, the first connection arm 220 can be placed on the first flange 250 and the second connection arm 225 can be placed on the second flange 255. Once the connection arms 220, 225 are placed at the respective flanges, the user-applied force can be removed from the support clip 155 and the support clip bias force can bring the connection arms 220, 225 back to the distance 232 between the connection arms 220, 225 set by biasing element 215 via the imparted the support clip bias force. In this way, the biasing element can be configured to maintain the first connection arm 220 at the first flange 250 and the second connection arm 225 at the second flange 255. FIG. 6 shows one illustrative example of the support clip 155 secured at the fencing post 120. In other applications of the insulator attachment device 110, the first connection arm 220 and/or the second connection arm 225 can be secured to other suitable locations at the fencing post 120. For instance, one of the connection arms 220, 225 can be secured at one of the flanges 250, 255 while the other of the connection arms 220, 225 can be secured at the base 245.

Figure 7:
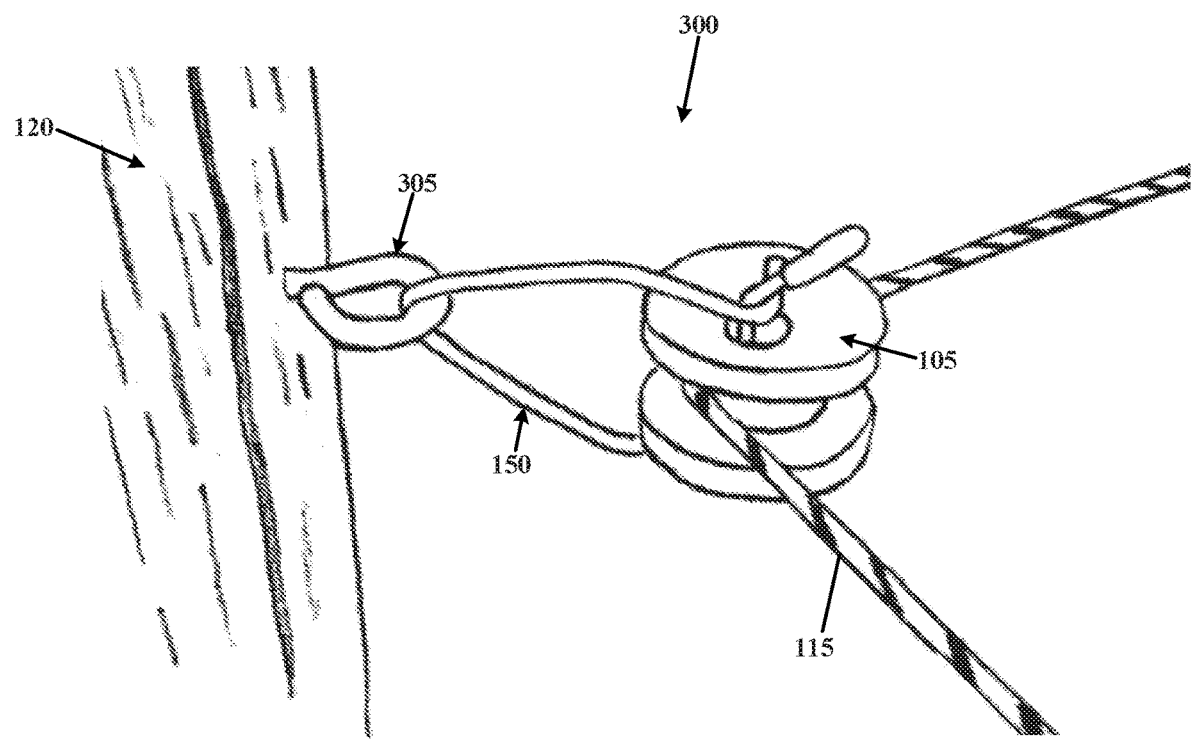
FIG. 7 is a perspective view of another exemplary embodiment of a fencing system.

FIG. 7 shows a perspective view of another exemplary embodiment of a fencing system 300. The fencing system 300 can be similar to the fencing system 100 previously described herein, but may not include the support clip. Instead, in the fencing system 300 the insulator clip 150 may be configured to secure directly to the fencing post 120. As shown here, the fencing post 120 can include an eye bolt 305. When in the opened position, the insulator clip 150 can be configured to receive the eye bolt 305 as well as the fencing insulator 105. Once the fencing insulator 150 has received the eye bolt 305 and the fencing insulator 105, the fencing insulator 150 can be moved to the closed position such that the insulator clip 150 can have the eye bolt 305 at one end and the fencing insulator 105 at an opposite end. In this way, the insulator clip 150 can be configured to link and secure the fencing insulator 105 to the fencing post 120 so that the fencing wire 115 can be conveniently placed and held relative to the fencing post 120.

Figure 8:
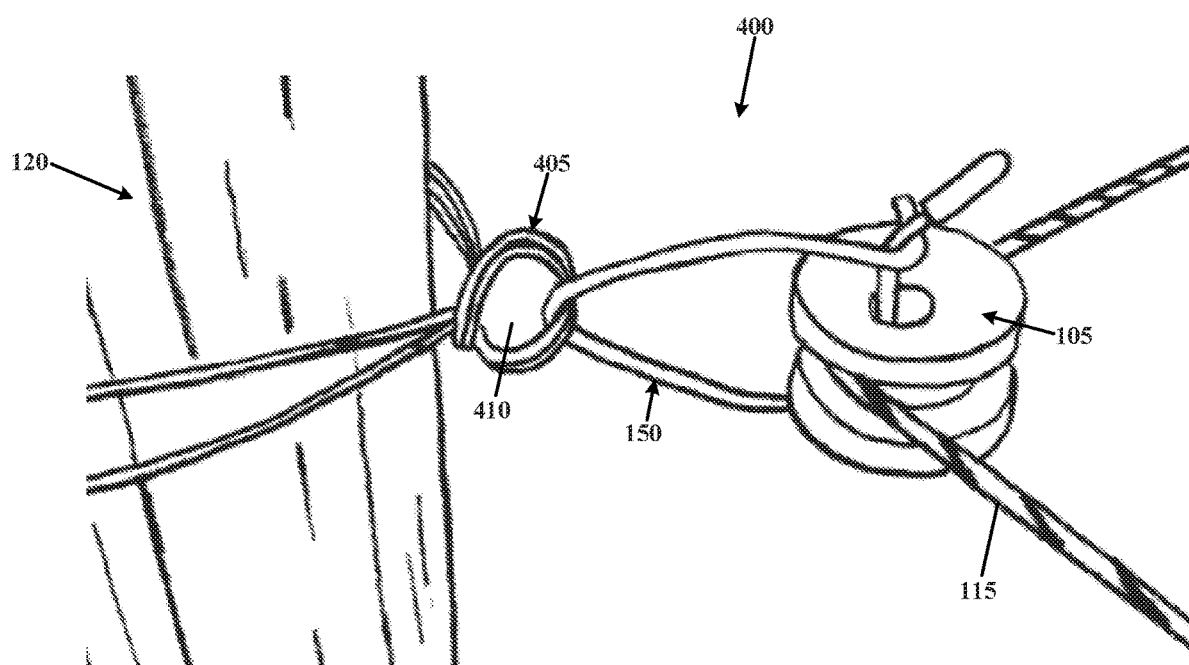
FIG. 8 is a perspective view of a further exemplary embodiment of a fencing system.

FIG. 8 shows a perspective view of a further exemplary embodiment of a fencing system 400. The fencing system 400 can be similar to the fencing system 100 previously described herein, but may not include the support clip. Instead, in the fencing system 400 the insulator clip 150 may be configured to secure directly to the fencing post 120. As shown here, wire 405 can be wrapped around the fencing post 120 and form a connection aperture 410. When in the opened position, the insulator clip 150 can be configured to receive the connection aperture 410 of the wire 405 as well as the fencing insulator 105. Once the fencing insulator 150 has received the connection aperture 410 and the fencing insulator 105, the fencing insulator 150 can be moved to the closed position such that the insulator clip 150 can have the connection aperture 410 at one end and the fencing insulator 105 at an opposite end. In this way, the insulator clip 150 can be configured to link and secure the fencing insulator 105 to the fencing post 120 so that the fencing wire 115 can be conveniently placed and held relative to the fencing post 120.

Figure 9:
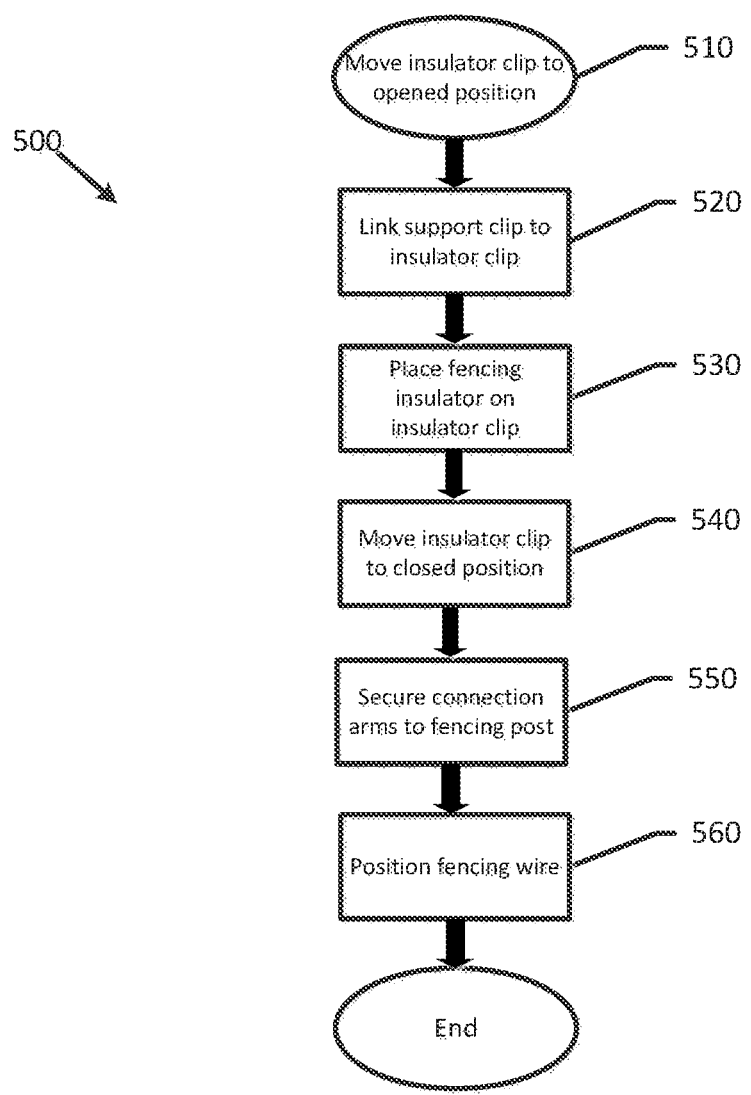
FIG. 9 is a flow diagram of an exemplary embodiment of a method for installing a fencing system.

FIG. 9 shows a flow diagram of an exemplary embodiment of a method 500 for installing a fencing system. At step 510, the method 500 includes moving an insulator clip, in opposition to an insulator clip bias force, from a closed position to an opened position. At the closed position a lever arm of the insulator clip can be seated at a catch arm of the insulator clip, and at the opened position the lever arm can be spaced from the catch arm. The insulator clip bias force may be imparted by a biasing element of the insulator clip and the insulator clip bias force may be overcome by user-applied force in moving the lever arm and the catch arm relative to one another.

At step 520, the method 500 includes linking a support clip to the insulator clip. The support clip can be linked to the insulator clip while the insulator clip in in the opened position. The support clip can include a securing portion and a receiving portion. The securing portion can have a first connection arm and a second connection arm, for instance in the form of a hook. The receiving portion can have a biasing element. The support clip and the insulator clip can be linked, at step 520, at the receiving portion of the support clip.

At step 530, the method 500 includes placing a fencing insulator on the insulator clip while the insulator clip is in the opened position. For example, the fencing insulator can define an internal bore and a portion of the insulator clip, such as the lever arm or catch arm, can be moved through the internal bore such that the fencing insulator is moved onto the continuous body of the insulator clip. The fencing insulator can be placed on the insulator clip before or after the support clip is linked to the fencing insulator at step 520.

At step 540, the method 500 includes moving the insulator clip from the opened position to the closed position after the support clip and the insulator clip are linked at step 520. As noted, moving the insulator clip to the closed position can include seating the lever arm of the insulator clip at the catch arm of the insulator clip.

At step 550, the method 500 includes securing the first connection arm of the support clip to a fencing post and securing the second connection arm of the support clip to the fencing post. The first connection arm can be secured at the fencing post at a first fencing post location, such as a first flange, that is spaced apart from a second fencing post location at which the second connection arm can be secured to the fencing post. In one example, the first connection arm and the second connection arm can be secured to the fencing post by overcoming a support clip bias imparted on the support clip by the biasing element, for instance via user-applied force at the support clip, and increasing a distance between the first connection arm and the second connection arm. While the support clip bias force is overcome, the first connection arm and the second connection arm can be placed at respective locations at the fencing post. Once the first connection arm and the second connection arm are placed at the fencing post, the support clip bias force can act to bring the first connection arm and the second connection arm back closer to one another to the distance therebetween prior to the support clip bias force being overcome. In this way, the support clip bias force may facilitate a secure attachment of the first connection arm and the second connection arm at the fencing post.

At step 560, the method 500 includes positioning a fencing wire onto the fencing insulator. For example, the fencing insulator may have a wire receiving surface present at a recess portion located between a first flange and a second flange of the fencing insulator and the fencing wire could be positioned onto the wire reeving surface of the fencing insulator. The fencing wire could be positioned onto the fencing insulator before or after moving the insulator clip to the closed position (e.g., when the insulator clip is in the opened position) and/or securing the first and second connection arms of the support clip to the fencing post.

Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. An insulator attachment device comprising:
an insulator clip including a lever arm and a catch arm, wherein the insulator clip is configured to move between an opened position at which the lever arm is spaced from the catch arm and a closed position at which the lever arm is seated at the catch arm, and wherein the insulator clip is configured to receive a fencing insulator in the opened position; and
a support clip including a securing portion and a receiving portion, the securing portion being configured to secure the support clip to a fencing post and the receiving portion being configured to receive the insulator clip, wherein the securing portion includes a first connection arm and a second connection arm, each of the first connection arm and the second connection arm being configured to secure the support clip to the fencing post, and wherein the receiving portion includes a biasing element.

2. The device of claim 1, wherein the catch arm includes a first catch arm portion and a second catch arm portion, and wherein the second catch arm portion extends from the first catch arm portion at an angle greater than ninety degrees and less than one hundred and eighty degrees relative to the first catch arm portion.

3. The device of claim 2, wherein the catch arm includes a seating surface between the first catch arm portion and the second catch arm portion, and wherein the lever arm is seated at the seating surface when the insulator clip is in the closed position.

4. The device of claim 1, wherein the lever arm includes a protective cap.

5. The device of claim 1, wherein the insulator clip includes a continuous body having a first body end and a second body end opposite the first body end, and wherein the lever arm is at the first body end and the catch arm is at the second body end.

6. The device of claim 5, wherein the continuous body is configured to impart an insulator clip bias force on each of the lever arm and the catch arm.

7. The device of claim 6, wherein the insulator clip bias force acts to maintain the insulator clip in the closed position at which the lever arm is seated at the catch arm.

8. The device of claim 1, wherein the biasing element is configured to impart a support clip bias force on each of the first connection arm and the second connection arm.

9. The device of claim 8, wherein the support clip bias force acts to maintain a distance between the first connection arm and the second connection arm.

10. The device of claim 9, wherein the biasing element is a torsion spring.

11. The device of claim 1, wherein the support clip includes a continuous body having a first body end and a second body end opposite the first body end, and wherein the first connection arm and the second connection arm are at the first body end and the biasing element is at the second body end.

12. The device of claim 11, wherein the first connection arm and the second connection arm each form a hook configured to secure the support clip to the fencing post.

13. The device of claim 1, wherein the first connection arm is configured to secure the support clip to a first flange of the fencing post and the second connection arm is configured to secure the support clip to a second flange of the fencing post.

14. A fencing system comprising:
a fencing insulator having a body defining a wire receiving surface and an internal bore;
an insulator clip including a lever arm and a catch arm, wherein the insulator clip is configured to move between an opened position at which the lever arm is spaced from the catch arm and a closed position at which the lever arm is seated at the catch arm, and wherein the internal bore of the fencing insulator is positioned at the insulator clip; and
a support clip including a securing portion and a receiving portion, the securing portion being configured to secure the support clip to a fencing post and the receiving portion linked to the insulator clip, wherein the securing portion includes a first connection arm and a second connection arm, each of the first connection arm and the second connection arm being configured to secure the support clip to the fencing post, and wherein the receiving portion includes a biasing element.

15. The fencing system of claim 14, wherein the catch arm includes a first catch arm portion and a second catch arm portion, and wherein the second catch arm portion extends from the first catch arm portion at an angle greater than ninety degrees and less than one hundred and eighty degrees relative to the first catch arm portion.

16. The fencing system of claim 14, wherein the insulator clip includes a continuous body having a first body end and a second body end opposite the first body end, wherein the lever arm is at the first body end and the catch arm is at the second body end, wherein the continuous body is configured to impart an insulator clip bias force on each of the lever arm and the catch arm that acts to maintain the insulator clip in the closed position at which the lever arm is seated at the catch arm.

17. The fencing system of claim 14, wherein the biasing element is configured to impart a support clip bias force on each of the first connection arm and the second connection arm that acts to maintain a distance between the first connection arm and the second connection arm.

18. The fencing system of claim 14, wherein the first connection arm and the second connection arm each form a hook configured to secure the support clip to the fencing post.

19. The fencing system of claim 14, further comprising:
a fencing post having a first flange and a second flange, wherein the first connection arm is secured to the first flange of the fencing post and the second connection arm is secured to the second flange of the fencing post; and
a fencing wire seated at the wire receiving surface of the fencing insulator.

20. A method for installing a fencing system, the method comprising the steps of:
moving an insulator clip in opposition to an insulator clip bias force from a closed position, at which a lever arm of the insulator clip is seated at a catch arm of the insulator clip, to an opened position, at which the lever arm is spaced from the catch arm;
linking a support clip to the insulator clip, wherein the support clip includes a securing portion and a receiving portion, the securing portion having a first connection arm and a second connection arm, the receiving portion having a biasing element, wherein the support clip and the insulator clip are linked at the receiving portion of the support clip;
placing a fencing insulator on the insulator clip when the insulator clip is in the opened position;
moving the insulator clip from the opened position to the closed position after the support clip and the insulator clip are linked;
securing the first connection arm to a fencing post and securing the second connection arm to the fencing post; and
positioning fencing wire onto the fencing insulator.

* * * * *